Nov. 20, 1934.   B. GANAWAY   1,981,228
BUSTER LEAD ATTACHMENT FOR TRACTORS
Filed Dec. 18, 1933   2 Sheets-Sheet 2

INVENTOR.
Bill Ganaway
BY John M. Hellman
ATTORNEY.

Patented Nov. 20, 1934

1,981,228

UNITED STATES PATENT OFFICE 1,981,228

BUSTER LEAD ATTACHMENT FOR TRACTORS

Bill Ganaway, Waxahachie, Tex.

Application December 18, 1933, Serial No. 702,958

4 Claims. (Cl. 97—47)

My invention relates to tractor buster plows of a type wherein the plows are carried by the tractor and my primary object is to provide an improvement embodying a means for connecting plows to the tractor whereby the traction wheels are made to travel in the furrows made by the plows and the guide wheel of the tractor to travel ahead in alinement with the rear plow, and on the uncut soil.

To those engaged in or familiar with farming and this type of plow it will be readily apparent that in this way the traction wheels find a more solid, unobstructed and substantial gripping surface for their tread than if these wheels rode over the plowed soil, or with one wheel on unplowed land and one wheel on plowed land. Furthermore, the traction wheels then are also guided by the furrows, and tend materially to maintain a straight course for the steering or guide wheel which travels ahead and on unplowed land.

Figure 1:
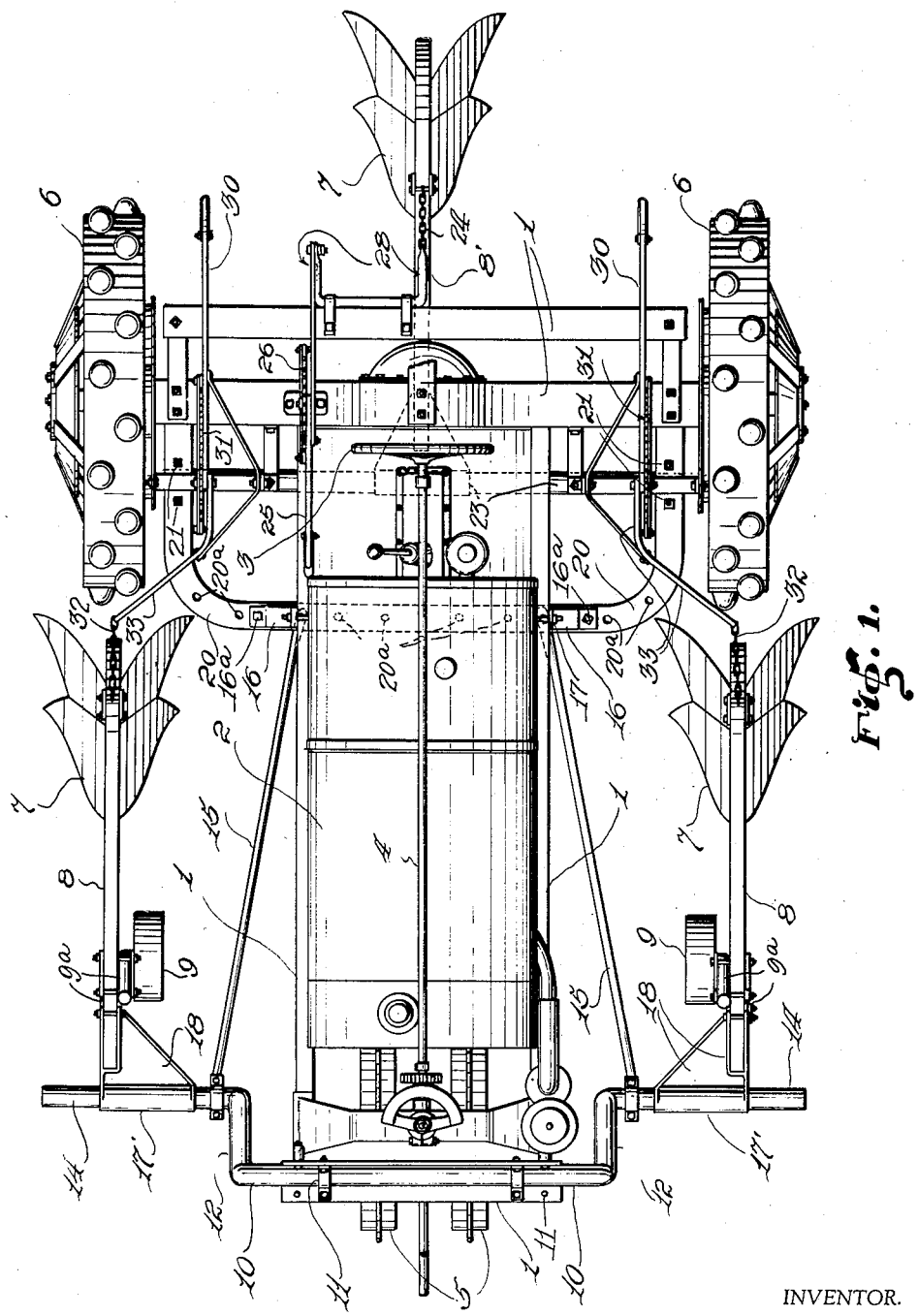
Figure 2:
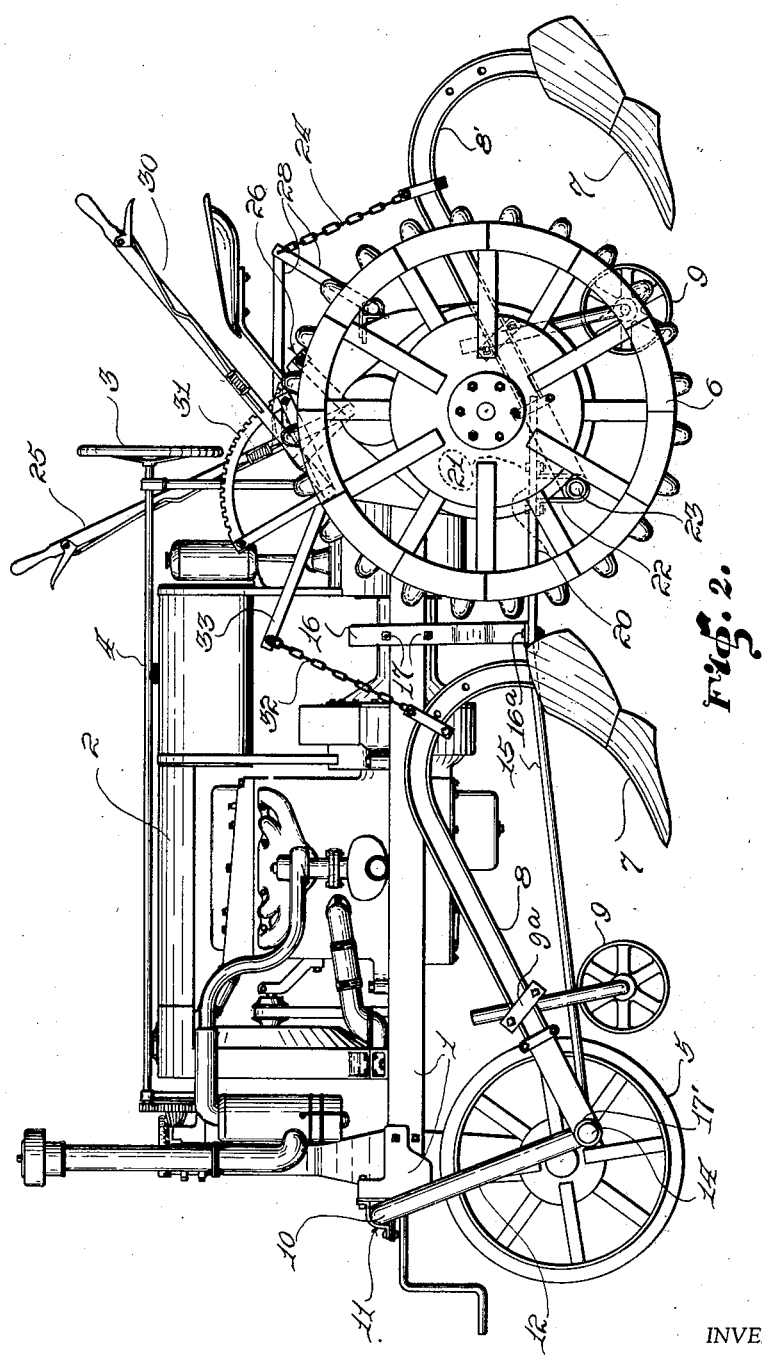

My invention includes other objects and important advantages in connection with the preceding, adapted to bring about a practical working embodiment of my invention, all of which are hereinafter described in detail in the following specification and illustrated in the accompanying drawings forming a part of this specification, in which drawings:

Figure 1 is a top plan view of a tractor buster plow illustrating an embodiment of my improvements, and Figure 2 is a side elevational view thereof.

Referring now to the drawings in detail, like parts bearing like numerals, the frame of the tractor is shown at 1, with engine 2, steering wheel 3, steering rod 4 and front or guide wheel or wheels 5. Traction wheels are shown at 6 and the buster plows at 7. Each plow has a beam 8 with a wheel 9 mounted thereon, as at 9ª, for vertical adjustment as well as adjustment longitudinally of the beam.

Supported upon the front end of the tractor frame 1 is a transversely heavy bar or rod 10, said bar or rod being hingedly but firmly fastened thereto by the strap-like clamps 11. The overhanging right-angled portions 12 of the bar or rod are obliquely positioned on opposite sides of and extended downwardly toward the rear of the tractor as clearly shown in Figures 1 and 2, at which point the bar or rod terminates in outwardly extending, horizontal, right angular end portions 14. Brace bars 15 are provided to hold the rod in a more stable and rigid position. The rear end of each brace bar is secured to a supplemental under frame 20 secured at its forward portion to the lower end portions of depending bracket members 16 which are U-bolted as at 17 to the frame 1 as will be apparent from the drawings, Figure 2. The plows 7 are carried by the plow beams 8, which are pivotally connected to the lateral extensions 14 of the rod 10, will be maintained in proper working position because the rod 10 is clamped to the front of the tractor frame to resist the forward thrusts of the tractor on the plows and plow beams, while the brace bars 15 which are connected between the extensions 14 and support 20 will resist backward thrusts of the tractor on the plows and plow beams. The terminating horizontal portions 14 of the bar or rod 10 are in direct alinement with the tread or tire portions of the respective traction wheels 6 on opposite sides of the tractor, consequently each side plow 7 with its beam 8 can be carried as shown directly in front of the traction wheel, so that when a furrow is made by the plow, the traction wheel 6 travels in the furrow and finds a more solid and gripping support.

Each side plow beam 8 is carried at its forward end on a sleeve 17' having a bracket extension 18 to which the beam is rigidly secured. The sleeve, however, works rotatably and freely on the terminal portion 14 of the bar or rod 11 to permit the plow free up and down movement.

The supplemental under frame 20, as shown, is substantially U-shaped and disposed recumbently with its leg portions rearwardly extended and obviously supported, in a manner not shown in detail, at the rear under portion of the tractor frame 1 or to the transmission housing, as may be the more convenient. At transversely opposite places, on the leg portions of said supplemental frame 20, as at 21, U-shaped strap-like brackets or clevises 22 are bolted, in which latter a relatively strong cross bar or rod 23 is supported at its end portions. This cross bar or rod 23 carries the rear plow beam 8' to which it is pivotally attached at its forward end. The rear plow beam is raised and lowered by the chain 24, lever 25, segment 26 and the links 28, and the side beams are operated by the levers 30, segments 31, chains 32 and links 33, alike on both sides and of well known construction.

For the practical adjustment of the plows, in addition to the aforesaid hingedly supporting of the beams thereof, with the controlling levers having the flexible chain connections to the beams, and the provision of the adjustable gauge wheels 9, swingable adjustment of arms 12 of the bar or rod 10 to raise and lower the horizontal end portions 14 is practically effected by the construction illustrated in the drawings, wherein the brace rods 15 have their rear end portions adjustably attached to the supplemental under frame 20. In this connection it may be here noted that said frame 20, as shown, is the regular U-shaped draft element of an ordinary farm or grading tractor to which the usual soil digging and treating attachments are attached in the working thereof, except that in the present invention the frame is mounted reversely, that is to say, in the ordinary use thereof the side legs of the frame are disposed forwardly, while in the machine of the present invention they extend rearwardly of the transverse portion to which the brace rods 15 are attached. The transverse portion of the frame, as clearly shown in Figure 1 of the drawings, is provided with a multiplicity of apertures 20ª, some of which are utilized for the bolting thereto of the lower end portions of the frame-supporting brackets 16, as at 16ª, the apertures between said brackets being utilized for the adjustable attachment of said brace rods 15 which, obviously, are preferably bifurcated and apertured for the reception of detachable securing bolts. By this provision the changing of the relative positions of the rear end portions of said rods 15, which are obliquely set convergently rearward from the places of attachment of their forward end portions to said horizontal end portions of the transverse drag bar or rod 10, angularity of said rods 15 is accordingly changed, thereby shortening or lengthening the distance between said under frame 20 and said drag bar or rod portions 14 and correspondingly swinging the portions 12 of said bar or rod 10 and, of course, effecting the raising or lowering of said end portions 14, as the case may be.

Obviously, by the relative vertical adjustment of the forward end portions of the plow beams 8, together with the adjustment, either vertically or longitudinally on said beams, of the gauge or depth-regulating wheels 9, the plows are readily and practically adapted to the digging or treatment of all soil conditions, hard or soft, as the case may be. Furthermore, it is obvious that the present invention is applicable to any ordinary tractor and does not require a special structure other than the parts to be added in carrying out the present invention. So, too, the structure is simple and compact, strong and durable, and by the convergence of the brace rods 15, all the strains and stresses are concentrated in the region of the longitudinal axis of the tractor.

From the foregoing it will be apparent that the tractor wheels 6, traveling in the furrows, not only are provided with a good gripping surface, practically free from loose soil, but in addition the furrows tend to maintain the tractor in a straight course. Likewise the front wheel or wheels 5, traveling on the uncut soil meet with no resistance from loose plowed ground. This arrangement has been found in actual operation to be practical, and even though only one side plow is in use, the pull of the tractor will not cause swerving or side winding. This is an added advantage, as it is frequently necessary and desirable to utilize only one plow.

While the disclosure shows and describes a practical working embodiment of my invention, it is to be understood that I do not limit the invention to the precise form here illustrated, as the particular means shown may be modified to some extent, to be, however, within the meaning and intent of the claims appended hereto.

It is also obvious that the attachment herein described and claimed will enable the machine to pull three buster plows instead of two buster plows as is the present practice without additional fuel cost. Furthermore, the placing of the two side plows in front of the traction wheels, with a relatively long drag beam, and having the third plow centrally in the rear of the transverse axis of the traction wheels, with a relatively short drag beam, the operator is not only enabled to more conveniently manipulate the controlling hand levers and watch the operation of the two side plows, but the steering of the tractor is more easily effected, particularly as the wheels travel in the furrows behind the plows, as hereinbefore described, and at the same time the relatively short beam of the rear central plow, hingedly attached, as it is, to the tractor, the machine as a whole has that short radius of up and down flexibility which makes the structure exceptionally practical for the plowing of terraced or very uneven surfaced fields, or, in other words, it travels readily with adaptability across undulated, ridged or terraced ground and the plows dig effectively and uniformly into the soil at all times.

What I claim as my invention is:

1. In combination with a tractor buster plow of the three plow type, a rod connected to the forward end of the tractor frame and extending rearwardly and downwardly of said frame, the said rod having lateral extensions adjacent the front wheels of the said tractor, means for bracing said extensions, plow beams pivotally mounted on said extensions and extending rearwardly in alinement with the rear wheels, plows mounted on the plow beams in front of the rear wheels, depth gauges mounted on the plow beams near the said extensions, a second rod extending transversely across the rear of the tractor frame and having a vertically adjustable plow beam connected to the center of the second rod with a plow mounted thereon, adjustable levers positioned near the tractor seat to operate each plow separately into and out of engagement with the land.

2. In combination with a tractor, laterally disposed supports at opposite sides of the forward portion of the tractor, said supports being mounted to swing on a transverse horizontal axis with respect to the tractor, brace rods attached at their forward end portions to said laterally disposed supports and extending convergently rearwardly therefrom on opposite sides of the longitudinal center of the tractor, said rods being respectively secured at their rear end portions adjustably transversely to a supporting frame portion of the tractor, plows at opposite sides of the tractor and having drag beams pivotally attached at their forward end portions to said laterally disposed supports, and means for raising and lowering said plows independently of each other at the will of the operator during operation.

3. In combination, as set forth in claim 2, and further including means for gauging the working depth of the respective plows comprising ground contacting wheels mounted adjustably both vertically and longitudinally on the drag beams of the plows.

4. In combination with a tractor, a transversely disposed bar rotatably mounted on the forward portion of the tractor, said bar having angular portions at opposite sides of the tractor and extending downwardly and rearwardly, the end portions of said bar being angular with respect to said other angular portions and extending horizontally, a transverse under frame member at the rear portion of the tractor, having a multiplicity of apertures therein, plows on opposite sides of the tractor, the respective plows having drag beams hingedly secured to the horizontal angular portions of said first mentioned transversely disposed bar, means on the tractor for raising and lowering said plows swingably on their forward hinge support, and a pair of brace bars respectively secured at their forward end portions to said horizontal angular portions of said transversely disposed bar, said brace bars extending convergently rearward, the rear end portions of said brace bars being apertured to receive detachable securing bolts receivable in selected apertures in said transverse under frame member of the tractor whereby to adjustably attach said brace bars to the under frame member and thereby accordingly adjust and hold said horizontal angular end portions of said transversely disposed forward bar in different planes.

BILL GANAWAY.